United States Patent [19]

Nakamichi et al.

[11] E Patent Number: Re. 32,007

[45] Reissued Date of Patent: Oct. 15, 1985

[54] MODE CHANGING SYSTEM FOR A CASSETTE TAPE RECORDER

[75] Inventors: Niro Nakamichi, Higashikurume; Kozo Kobayashi, Kodaira; Hideo Kawachi, Ichikawa, all of Japan

[73] Assignee: Nakamichi Corporation, Tokyo, Japan

[21] Appl. No.: 580,867

[22] Filed: Feb. 16, 1984

Related U.S. Patent Documents

Reissue of:

[64] Patent No.: 4,272,792
Issued: Jun. 9, 1981
Appl. No.: 52,020
Filed: Jun. 25, 1979

[30] Foreign Application Priority Data

Jun. 28, 1978 [JP] Japan ..... 53-78170

[51] Int. Cl.[4] ..... G11B 15/18; G11B 19/02

[52] U.S. Cl. ..... 360/69; 360/137

[58] Field of Search ..... 360/69, 137, 71, 74.1, 360/96.1, 105

[56] References Cited

U.S. PATENT DOCUMENTS 3,947,894 3/1976 Chimura ..... 360/137
4,079,637 3/1978 Nowak ..... 74/816
4,194,229 3/1980 Yamamoto et al. ..... 360/137

FOREIGN PATENT DOCUMENTS 46-211178 6/1971 Japan ..... 360/69
1205273 9/1970 United Kingdom .

*Primary Examiner*—John H. Wolff
*Attorney, Agent, or Firm*—Pearne, Gordon, Sessions, McCoy, Granger & Tilberry

[57] ABSTRACT

This invention relates to a mode changing system for a cassette tape recorder in which operating members such as a head base plate and a pinch roller are selectively moved to one of various modes such as stopping, fast forwarding, rewinding, pausing, cueing and playing. This system comprises control means to control the operating members so as to move them to a position corresponding to a selected one of the modes. The control means is actuated by a control electric motor. The system further comprises a mode selective switch group to select one of the modes, a reference signal generating circuit to generate a reference signal corresponding to the selected one of the modes in accordance with the selection of the modes by means of the mode selective switch group, a variable signal generating circuit to generate a variable signal which continuously varies with the rotation of the control electric motor and an operational circuit to receive both of the reference and variable signals so as to rotate the control electric motor for moving the operating members toward the position corresponding to the selected mode.

4 Claims, 2 Drawing Figures

MODE CHANGING SYSTEM FOR A CASSETTE TAPE RECORDER

Matter enclosed in heavy brackets [ ] appears in the original patent but forms no part of this reissue specification; matter printed in italics indicates the additions made by reissue.

BACKGROUND OF THE INVENTION

In the prior arts, various mode changing systems have been proposed in which [movable components] *operating members* for a cassette tape recorder such as a head base plate and a pinch roller are selectively moved to a position corresponding to the selected one of modes such as stopping, fast forwarding rewinding, pausing, cueing and playing or recording. However, the prior mode changing system which is of manually operating type, has an operating lever provided with lock means, which causes the system to be complicated in its construction and to have a number of parts. Thus, the system is not only expensive, but also has a difficulty to be handled. In addition thereto, it is difficult to remote-control the system. Another prior mode changing system which is of electrically operating type, has plunger means which is not always positive in its operation and has a temperature highly increasing during its operation. Thus, the system is disadvantageously ineffective and also tends to generate a noise while it is operated.

SUMMARY OF THE INVENTION

Accordingly, it is a principal object of the invention to provide a mode changing system for a cassette tape recorder having a decreased number of parts by simplifying the construction of the system so that the whole system is inexpensive.

It is another object of the invention to provide a mode changing system for a cassette tape recorder in which changing a mode can be stably and quietly effected.

It is still another object of the invention to provide a mode changing system for a cassette type tape recorder which is adapted to be operated more easily and also to be remote-controlled.

In accordance with the present invention, there is provided a mode changing system for a cassette tape recorder wherein operating members such as a head base plate and a pinch roller are moved in accordance with operating modes of said cassette tape recorder comprising control means to control operating members for said cassette tape recorder to move said operating members to a position corresponding to a selected one of modes; a control electric motor to actuate said control means; a mode selective switch group to select one of said modes; a reference signal generating circuit to generate a reference signal corresponding to the selected one of said modes in accordance with the selection of said modes by means of said mode selective switch group; a variable signal generating circuit to generate a variable signal which continuously varies with the rotation of said control electric motor; and an operational circuit to receive said reference signal at one of its inputs and said variable signal at the other input to comparatively operate said signals to generate a control output so as to rotate said control electric motor, said operational circuit being associated with said control means and said variable signal generating circuit so that said control output is generated for rotating said control electric motor when said operating members are at a position different from the position corresponding to the selected mode and for stopping said control electric motor when said movable components reach the position corresponding to the selected mode.

BRIEF DESCRIPTION OF THE DRAWING

The above and other objects and features of the invention will be apparent from the description of the embodiment taken with reference to the accompanying drawing in which.

DETAILED DESCRIPTION OF THE EMBODIMENT

Figure 1:
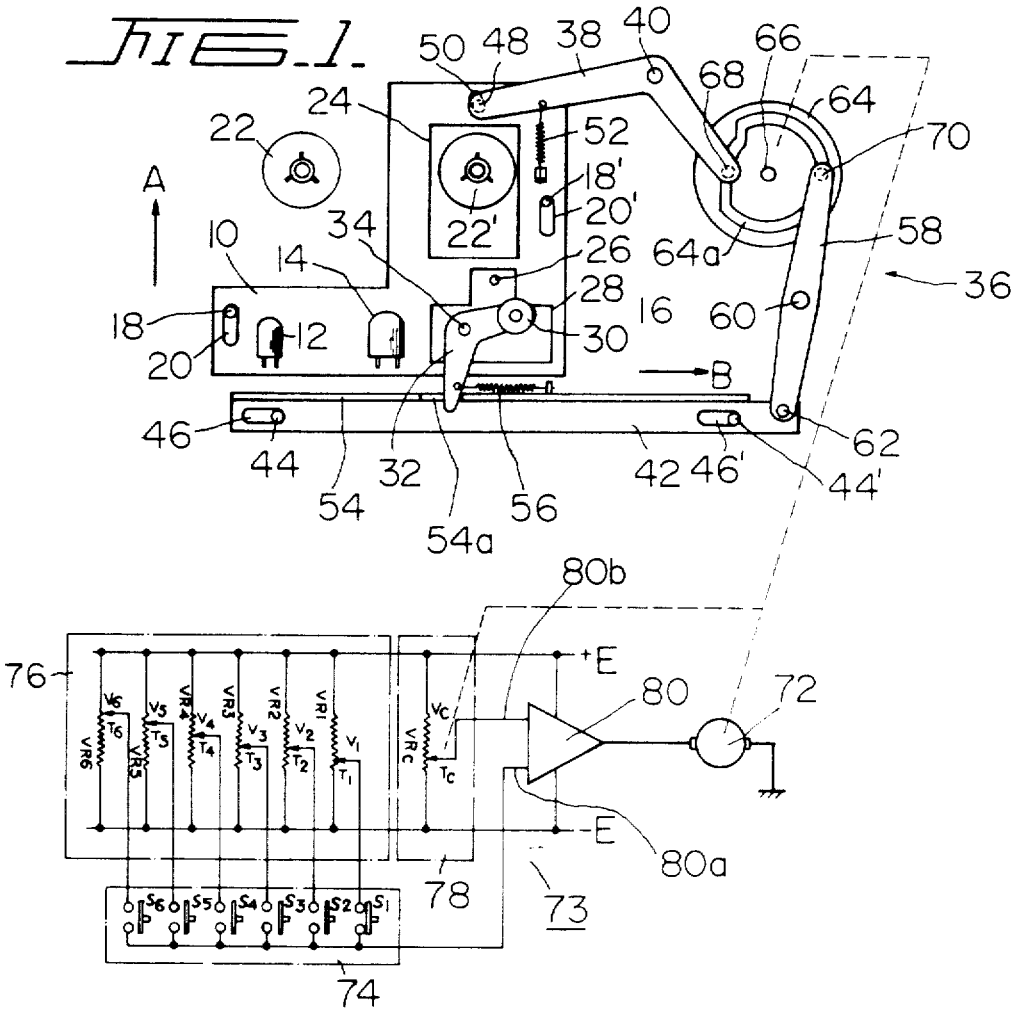
FIG. 1 schematically illustrates a mode changing system for a cassette tape recorder constructed in accordance with the invention.

In FIG. 1, a head base plate 10 which has an erasing head 12 and a recording and reproducing head 14 mounted thereon is movably disposed on a chassis 16. The head base plate 10 may be guided by guide pins 18 and 18' secured to the chassis 16 and extending through slots 20 and 20' in the head base plate 10. Thus, the head base plate 10 may be movable in a direction indicated by an arrow A in FIG. 1. A pair of reel wheels 22 and 22' are provided on a chassis 16. The reel wheel 22' may be disposed in a rectangular opening 24 in the head base plate 10. A cassette tape (not shown) is mounted on and passes between the reel wheels 22 and 22'. A capstan 26 extends from the chassis 16 and extends through a reversely T-shaped opening 28 in the head base plate 10. A pinch roller 30 may be mounted on one end of an L-shaped lever 32 which is in turn pivotally mounted on the chassis 16 by a pivot pin 34 provided on the chassis 16 and extending through the reversely T-shaped opening 28. The tape is fed by the capstan 26 while it is held between the capstan 26 and the pinch roller 30.

There is provided operate means 36 to control the head base plate 10 and the pinch roller 30 so as to move them to a position corresponding to a selected one of plural modes. This control means 36 may include a curved control lever 38 pivotally mounted on the chassis 16 by a pivot pin 40 and a slidable arm 42 guided in a direction indicated by an arrow B in FIG. 1 by guide pins 44 and 44' on the chassis 16 which in turn extend through slots 46 and 46' in the slidable arm 42. The control lever 38 at one end has a pin 48 provided thereon and engaging a slot 50 in the head base plate 10. A coil spring 52 may be provided between the head base plate 10 and the control lever 38 to urge the head base plate 10 in the direction indicated by the arrow A in FIG. 1. Thus, if the control lever 38 is angularly moved in a clockwise direction in FIG. 1, then the heads 12 and 14 are moved in a forward manner toward the tape, but if the control lever 38 is angularly moved in a counterclockwise direction in FIG. 1, then the heads 12 and 14 are moved in a backward direction in FIG. 1. The slidable arm 42 may comprise a raised plate 54 secured thereto and having a notch 54a through which the L-shaped lever 32 at the other end extends. A coil spring 56 may be provided between the other end of the L-shaped lever 32 and the raised plate 54 on the slidable arm 42 to urge the L-shaped lever 32 in a counterclockwise direction in FIG. 1 so as to move the pinch roller 30 toward the capstan 26. Thus, if the slidable arm 42 is moved in a rightward direction (indicated by the arrow B) in FIG. 1, then the pinch roller 30 is moved toward the capstan 26, but if the slidable arm 42 is moved in a leftward direction in FIG. 1, then the pinch roller 30 is moved far away from the capstan 26 against the urging of coil spring 56. There is also provided a control lever 58 which is pivotally mounted on the chassis 16 by a pivot pin 60. One end of the control lever 58 is pivotally connected to the slidable arm 42 by a pivot pin 62. Angular movement of the control lever 58 causes the slidable arm 42 to move in a rightward or leftward direction in FIG. 1.

The control means 36 may further comprise a cam 64 having a groove 64a and rotatably mounted on the chassis 16 by a shaft 66. The other end of the control lever 38 and the other end of the control lever 58 have respective control pins 68 and 70 engaging the groove 64a in the cam 64 so that the engaging points of the control levers 38 and 58 are disposed at an angle of 180° relative to the shaft 66.

Figure 2:
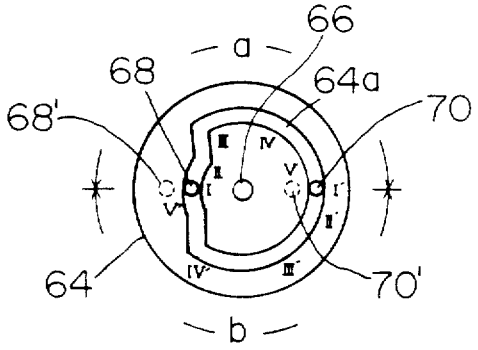
FIG. 2 shows in a top view a relation of a cam and control pins engaged therewith.

As shown in FIG. 2, the cam groove 64a has a first angular section a in which the control pin 68 engages, and a second angular section b in which the control pin 70 engages. The cam groove 64a is so designed that the control pin 68 is at the position shown in a solid line in FIG. 2 in the modes of stopping, fast forwarding and rewinding and at the position shown in a broken line in FIG. 2 in the modes of playing, pausing and cueing, while the control pin 70 is at the position shown in a solid line in FIG. 2 in the modes of stopping, fast forwarding, rewinding, pausing and cueing and at the position shown in a broken line in the mode of playing. In FIG. 2, the numerals indicated along the cam groove 64a show the positions at which the control pins 68 and 70 are located in the respective modes, numerals I and I' designate the position of the stopping mode *and the rewinding mode*, numerals II and II' the position of the fast forwarding mode, numerals III and III' the position of the cueing mode, numerals IV and IV' the position of the pausing mode, and numerals V and V' the position of the playing mode.

The mode changing system of the invention comprises a control electric motor 72 which rotates the cam 64 through a reduction gear, not shown, and drive means 73 which drives the control electric motor 72. The drive means 73 comprises a mode selective switch group 74, a reference signal generating circuit 76, a variable signal generating circuit 78 and an operational circuit or amplifier 80.

The mode selective switch group 74 comprises six switches $S_1$, $S_2$, $S_3$, $S_4$, $S_5$ and $S_6$ which serve to select the stopping, rewinding, fast forwarding, cueing, pausing and playing modes, respectively. The reference signal generating circuit 76 comprises six variable resistors $VR_1$, $VR_2$, $VR_3$, $VR_4$, $VR_5$ and $VR_6$ which are provided in parallel between source terminals +E and −E to generate reference voltages $V_1$ to $V_6$ corresponding to the respective modes at the respective variable terminals $T_1$ to $T_6$. The switches $S_1$ to $S_6$ at their one end are connected to the respective variable terminals $T_1$ to $T_6$ and at their other end connected to one of inputs 80a of the operational circuit 80. The variable signal generating circuit 78 comprises a variable resistor $VR_c$ which is provided in parallel to the reference signal generating circuit 76 between the source terminals +E and −E and has a variable terminal $T_c$ slidable with angular movement of the cam 64 by means of the control electric motor 72 to generate a variable voltage $V_c$ corresponding to the angular position of the cam 64 at the variable terminal $T_c$. The variable terminal $T_c$ is connected to the other input 80b of the operational circuit 80.

The operational circuit 80 serves to receive and comparatively operate the reference voltage selected from $V_1$ to $V_6$ and the variable voltage $V_c$ at its inputs 80a and 80b. Thus, if the reference and variable voltage are equal to each other, then the operational circuit 80 generates a control output of O to maintain the control electric motor 72 in the stopped condition, if the reference voltage selected from $V_1$ to $V_6$ is higher than the variable voltage $V_c$, then the operational circuit 80 generates one control output to rotate the control electric motor 72 in a forward direction, and if the reference voltage selected from $V_1$ to $V_6$ is lower than the variable voltage $V_c$, then the operational circuit 80 generates another control output to rotate the control electric motor in a reverse direction. If the control electric motor 72 is rotated in the forward direction, the cam 64 is angularly moved in a counterclockwise direction in FIGS. 1 and 2, and the variable terminal $T_c$ of the variable signal generating circuit 78 is slidably moved to make the variable voltage $V_c$ higher. Reversely, if the control electric motor 72 is rotated in the reverse direction, the cam 64 is angularly moved in a clockwise direction in FIGS. 1 and 2, and the variable terminal $T_c$ of the variable signal generating circuit 78 is slidably moved to make the variable voltage $V_c$ lower. It will be noted that, since the cam groove 64a is sequentially set at the fast forwarding or rewinding, cueing, pausing and playing positions II, II', III, III', IV, IV' and V, V' in a clockwise direction, in relation to the reference position I, I' of stopping, the reference voltages $V_1$ to $V_6$ are so set that the reference voltage $V_1$ is minimum, the reference voltage $V_6$ is maximum and the reference voltages $V_2$ and $V_3$ are equal to each other.

In operation, supposing that the switch $S_1$ is closed, as shown, to select the stopping mode in which the control electric motor 72 stops. When an operator closes the switch $S_6$ to select the playing mode, the reference voltage $V_6$ at the input 80a of the operational circuit 80 is higher than the variable voltage $V_c$, and therefore, the operational circuit 80 causes the control electric motor 72 to be rotated in a forward direction. Thus, the cam 64 is angularly moved in a counterclockwise direction in FIGS. 1 and 2 while the variable terminal $T_c$ is slidably moved so as to make the variable voltage $V_c$ higher. In this manner, the level of the variable voltage $V_c$ approaches that of the reference voltage $V_6$ until the former is equal to the latter. At that time, the operational circuit generates the control output of O which causes the control electric motor 72 to be stopped. Thus, the control pins 68 and 70 are located at the playing positions V and V' of the cam groove 64a and as a result, displaced from the solid line positions to the broken line positions indicated by numerals 68' and 70', respectively. Such displacement of the control pins 68 and 70 causes the control lever 38 to be angularly moved in a clockwise direction to move the head base plate 10 in a forward direction (indicated by the arrow A in FIG. 1), and the control lever 58 to be angularly moved in a counterclockwise direction to move the slidable arm 42 in a rightward direction (indicated by the arrow B in FIG. 1) so as to allow the L-shaped lever 32 to angularly move in a counterclockwise direction by means of the coil spring 56 to thereby urge the pinch roller 30 against the capstan 26. Thus, it will be noted that the cassette tape is supposed to be placed in the playing mode of the tape recorder.

In order to change the tape recorder from the playing mode to the stopping mode, the switch $S_1$ is closed and the components of the system is operated in a reverse manner to that of the above operation. Thus, the head base plate 10 is moved in a backward direction by the angular movement of the control lever 38 in a counterclockwise direction in FIG. 1 while the pinch roller 30 is moved far away from the capstan 26 by the angular movement of the control lever 58 in a clockwise direction in FIG. 1 and the resultant slidable movement of the slidable arm 42 in a leftward direction in FIG. 1.

It will be understood that, in case another mode of the tape recorder is selected by the corresponding switch of the mode selective switch group, the operating members such as the head base plate 10 and the pinch roller 30 will be moved in accordance with the selected mode in a manner similar to that of the selection of the modes. It will be also understood that a drive means for the reel wheels 22 and 22' and an amplifying circuit for recording or reproducing the tape will be operated in association with the selection of the modes in a conventional manner.

It should be noted that the operational circuit 80 controls the control electric motor 72 so that the level of the variable voltage $V_c$ becomes equal to that of the variable voltage selected from $V_1$ to $V_6$. Thus, if the profile of the cam groove 64a around the playing position V or V' is so designed that the eccentricity of the cam groove 64a relative to the shaft 66 varies in a moderate manner, then the position of the head base plate 10 and the angular position of the L-shaped lever 32 can be minutely controlled by the fine adjustment of the variable terminal $T_6$ of the variable resistor $VR_6$. As a result, the condition of the heads 12 and 14 contacting with the tape and the force of urging the pinch roller 30 against the capstan 26 can be precisely controlled. In a similar manner, if the profile of the cam groove 64a around the cueing position III is designed in an identical form, then the condition of the heads 12 and 14 contacting with the tape can be precisely controlled.

Although, in the above embodiment, the components or operating members to be controlled or moved, such as the head base plate 10 and the pinch roller 30 are controlled by the single groove 64a in the common cam 64 engaged by the control pins 68 and 70, they may be separately controlled either by two grooves provided in the upper and lower faces of the common cam 64 or by respective grooves in separate cams. It will be understood that a brake device for the reel wheels may be also controlled in its position by the mode changing system. *More particularly, the brake device may be so operated as to prevent the reel wheels from being driven in the stopping mode, and so controlled as to be released to allow the reel wheels to be driven in the fast forwarding and rewinding modes. Respective mode selective switches may control the traveling direction of the magnetic tape so that it travels in a forward or a reverse rewinding direction.*

Further, although the stopping mode and the fast forwarding and rewinding modes in which the head base plate 10 and the pinch roller 30 are at the respective common positions are set at the different position I and II of the cam groove 64a, they may be set at the same position of the cam groove 64a. In the above embodiment, the reference signal and variable signal generating circuits 76 and 78 are adapted to generate voltages as the signals, nevertheless it will be understood that they may be adapted to generate frequency signals. In this case, the operational circuit 80 would compare the frequency signals from the signal generating circuits 76 and 78 to produce a control output therefrom.

While one preferred embodiment of the invention has been illustrated and described with reference to the accompanying drawing, it will be understood that it is by way of example, and that various changes and modifications may be made without departing from the spirit and scope of the invention, which is intended to be defined only by the appended claims.

What is claimed is:

1. A mode changing system for a cassette tape recorder wherein operating members such as a head base plate and a pinch roller are moved in accordance with operating modes of said cassette tape recorder comprising:

control means to control movement of the operating members to take a position corresponding to a selected mode of said cassette tape recorder;

a *bidirectional* control electric motor to actuate said control means;

a mode selective switch group to select one of said modes;

a reference signal generating circuit to generate a reference signal corresponding to the selected one of said modes in accordance with the selection of said modes by means of said mode selective switch group;

a variable signal generating circuit to generate a variable signal which continuously varies with the rotation of said control electric motor; [and]

an operational circuit to receive said reference signal at one of its inputs and said variable signal at the other input to compare said signals to generate a control output so as to rotate said control electric motor, said operational circuit being associated with said control means and said variable signal generating circuit so that said control output is generated for rotating said control electric motor when said operating members are at a position different from the position corresponding to the selected mode and for stopping said control electric motor when said operating members reach the position corresponding to the selected mode*;*

*said control means including a rotary cam means having an advancing rotary range in which said operating member is advanced for engagement with a cassette tape and a retracting rotary range in which said operating member is retracted from the tape corresponding to a plurality of retracting modes, said retracting modes being placed together on said rotary cam means; and*

*said cam means being reversibly driven by said motor within a predetermined rotary angular range including said advancing and retracting rotary ranges corresponding to the selected operation of said mode selective switch group.*

2. A mode changing system for a cassette tape recorder as set forth in claim 1, said reference signal generating circuit generating a reference voltage and said variable signal generating circuit generating a variable voltage.

3. A mode changing system for a cassette tape recorder as set forth in claim 2, said operational circuit generating such a control output that said control electric motor is rotated in a direction in which the level of said variable voltage varies toward the level of said reference voltage and that said control electric motor is stopped when the level of said variable voltage becomes equal to the level of said reference voltage.

[4. A mode changing system for a cassette tape recorder as set forth in claim 1, wherein said control means comprises cam means to move said operating members in accordance with the rotation of said control electric motor.]

[5. A mode changing system for a cassette tape recorder as set forth in claim 4, said reference signal generating circuit generating a reference voltage and said variable signal generating circuit generating a variable voltage.]

[6. A mode changing system for a cassette tape recorder as set forth in claim 5, said operational circuit generating such a control output that said control electric motor is rotated in a direction in which the level of said variable voltage varies toward the lever of said reference voltage and that said control electric motor is stopped when the level of said variable voltage becomes equal to the level of said reference voltage.]

*7. A control system for a cassette type tape recorder comprising a head base plate on which head means for a cassette type tape recorder is mounted, rotary cam means to move said head base plate corresponding to at least one advancing mode in which said head means engages a magnetic tape in a cassette and a plurality of retracting modes in which said head means is disengaged from said magnetic tape, a mode selective switch group operable so as to select one of said at least one advancing mode and said plurality of retracting modes, and a control motor driven in response to the selective operation of said mode selective switch group in a controlled manner to rotate said cam means to a predetermined rotary position in accordance with the selected mode, characterized in that;*

*said cam means has an advancing rotary range in which said head base plate is advanced corresponding to said advancing mode and has a retracting rotary range in which said head base plate is retracted corresponding to said retracting modes, said retracting modes being placed together; said control motor being reversible; said cam means being reversibly controlled within a predetermined rotary angular range comprising said advancing and retracting rotary range relative to reversible rotation of said control motor corresponding to the selected operation of said mode selective switch group;*

*a reference signal generating circuit to generate a reference signal corresponding to the selected one of said modes in accordance with the selection of said modes by means of said mode selective switch group;*

*a variable signal generating circuit to generate a variable signal which continuously varies with the rotation of said control electric motor; and*

*an operational circuit to receive said reference signal at one of its inputs and said variable signal at the other input to compare said signals to generate a control output so as to rotate said control electric motor, said operational circuit being associated with said control means and said variable signal generating circuit so that said control output is generated for rotating said control electric motor when said operating members are at a position different from the position corresponding to the selected mode and for stopping said control electric motor when said operating members reach the position corresponding to the selected mode.*

* * * * *